US012641143B2

(12) United States Patent
Tadokoro et al.

(10) Patent No.: US 12,641,143 B2
(45) Date of Patent: May 26, 2026

(54) COMMUNICATION SYSTEM, COMMUNICATION METHOD, AND COMMUNICATION PROGRAM

(71) Applicant: NTT, Inc., Tokyo (JP)

(72) Inventors: Masashi Tadokoro, Musashino (JP); Taisuke Wakasugi, Musashino (JP); Hideaki Tanaka, Musashino (JP)

(73) Assignee: NTT, Inc., Tokyo (JP)

( * ) Notice: Subject to any disclaimer, the term of this patent is extended or adjusted under 35 U.S.C. 154(b) by 30 days.

(21) Appl. No.: 18/712,078

(22) PCT Filed: Dec. 3, 2021

(86) PCT No.: PCT/JP2021/044576
§ 371 (c)(1),
(2) Date: May 21, 2024

(87) PCT Pub. No.: WO2023/100376
PCT Pub. Date: Jun. 8, 2023

(65) Prior Publication Data
US 2025/0030756 A1      Jan. 23, 2025

(51) Int. Cl.
H04L 67/025          (2022.01)
G06F 3/0481          (2022.01)

(52) U.S. Cl.
CPC .......... H04L 67/025 (2013.01); G06F 3/0481 (2013.01)

(58) Field of Classification Search
CPC .................................................... H04L 67/025
See application file for complete search history.

(56) References Cited

U.S. PATENT DOCUMENTS

| 7,937,447 | B1 * | 5/2011 | Cohen | H04L 49/70 |
| | | | | 710/33 |
| 2009/0055559 | A1 * | 2/2009 | Katayama | G09G 5/006 |
| | | | | 709/239 |
| 2010/0306163 | A1 * | 12/2010 | Beaty | G06F 11/3093 |
| | | | | 718/1 |
| 2011/0225566 | A1 * | 9/2011 | Muharsky | G06F 11/3672 |
| | | | | 717/124 |
| 2011/0225569 | A1 * | 9/2011 | Beaty | G06F 11/3414 |
| | | | | 717/127 |
| 2014/0122566 | A1 * | 5/2014 | Spracklen | H04N 19/895 |
| | | | | 709/203 |

(Continued)

FOREIGN PATENT DOCUMENTS

| JP | 2014134868 | 7/2014 |
| JP | 201772872 | 4/2017 |
| JP | 2020141329 | 9/2020 |

*Primary Examiner* — Hieu T Hoang
(74) *Attorney, Agent, or Firm* — Fish & Richardson P.C.

(57) ABSTRACT

A work terminal (10) notifies a remote terminal (20) of a cooperation display ID of a local UI component that is a UI component corresponding to a UI component displayed on the work terminal (10) and is displayed on the remote terminal (20). The remote terminal (20) then displays a local UI component corresponding to the cooperation display ID of the local UI component received from the work terminal (10). Subsequently, in a case where input information is input to the displayed local UI component, the remote terminal (20) transmits the input information to the work terminal (10). The work terminal (10) then reflects the input information on the UI component corresponding to the local UI component.

9 Claims, 15 Drawing Sheets

(56)                    References Cited

U.S. PATENT DOCUMENTS

2015/0372984 A1*  12/2015  Kacmarcik  .........  H04L 63/0428
                                                          709/228
2016/0127213 A1*   5/2016  Shimada  ............  H04L 12/6418
                                                          709/219
2016/0341437 A1*  11/2016  Matsuoka  ................  F24F 11/64
2020/0136944 A1*   4/2020  Cheng  ....................  H04L 43/08
2023/0064833 A1*   3/2023  Kumar  ................  G06F 3/04886

* cited by examiner

Fig. 3

| COOPERATION ID | UI COMPONENT | LOCAL UI COMPONENT |
|---|---|---|
| 1 | A | a |
|  |  |  |

Fig. 5

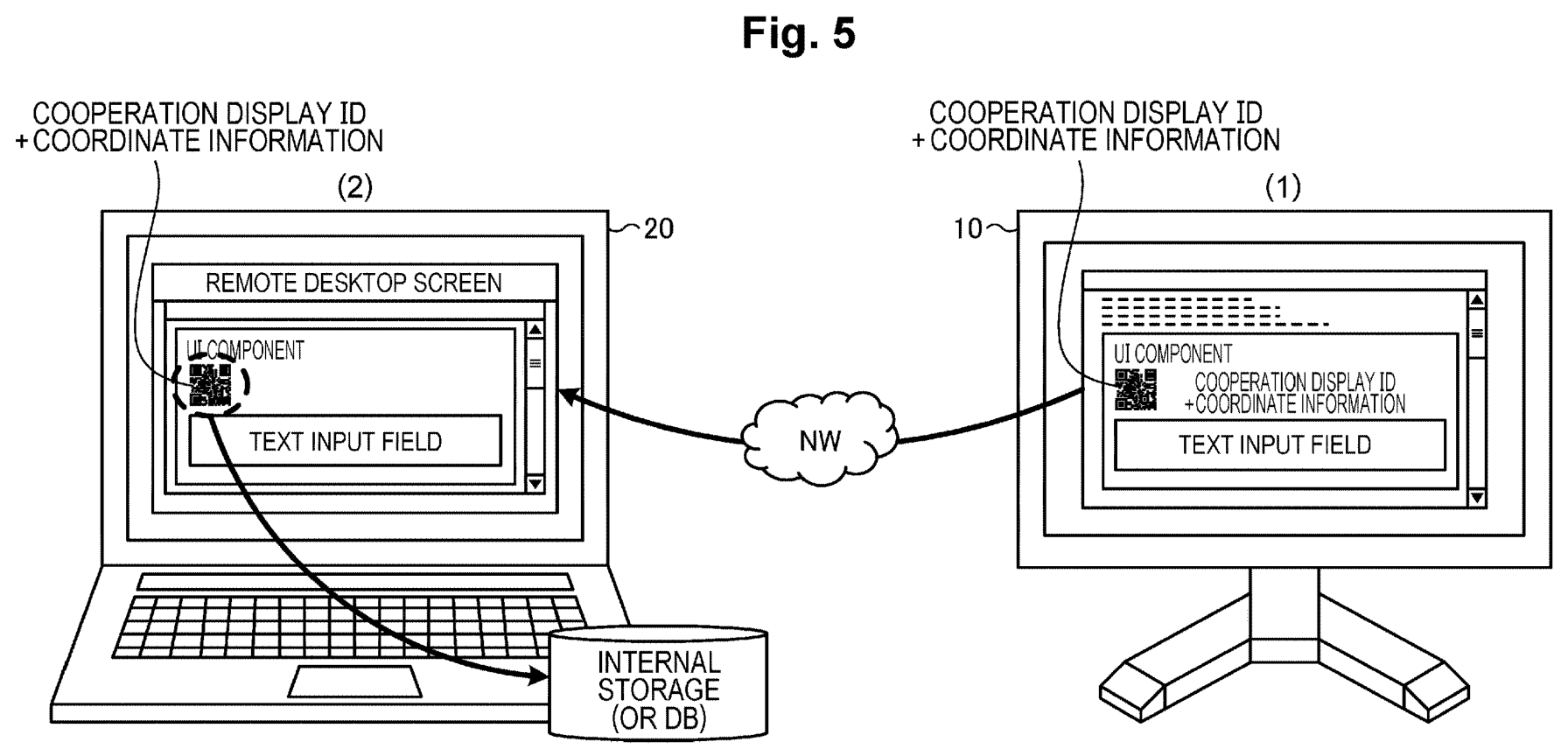

COOPERATION DISPLAY ID
+COORDINATE INFORMATION
(1)

UI COMPONENT

COOPERATION DISPLAY ID
+COORDINATE INFORMATION

TEXT INPUT FIELD

10

NW

20

REMOTE DESKTOP SCREEN

UI COMPONENT

TEXT INPUT FIELD

COOPERATION DISPLAY ID
+COORDINATE INFORMATION
(2)

INTERNAL
STORAGE
(OR DB)

A AND B OF UI COMPONENTS ARE
INDEPENDENT HOWEVER, THEY ARE
ASSOCIATED WITH EACH OTHER BY ID

REMOTE
TERMINAL

ID: N

LOCAL UI
COMPONENT

A

NW

WORK
TERMINAL

ID: N

UI COMPONENT

B

DELAY OR PACKET LOSS

Fig. 15

COMMUNICATION SYSTEM, COMMUNICATION METHOD, AND COMMUNICATION PROGRAM

CROSS-REFERENCE TO RELATED APPLICATIONS

This application is a National Stage application under 35 U.S.C. § 371 of International Application No. PCT/JP2021/044576, having an International Filing Date of Dec. 3, 2021.

The disclosure of the prior application is considered part of the disclosure of this application, and is incorporated by reference in its entirety into this application.

TECHNICAL FIELD

The present invention relates to a communication system, a communication method, and a communication program.

BACKGROUND ART

Conventionally, a UI extension technique has been proposed as a technique for achieving improvement of the productivity of an operator by overlaying a function extension such as a text input box or an input check on a web screen without modifying a system. In addition, work may be performed in a remote environment in which a remote terminal in a home or the like is remotely connected to a work terminal in an office.

CITATION LIST

Patent Literature

Patent Literature 1: JP 2017-072872 A

SUMMARY OF INVENTION

Technical Problem

However, the conventional UI extension technique has a problem that it is not possible to easily improve work efficiency without deteriorating operability even in a remote environment. For example, in a case where an operation is performed in a remote environment (remote terminal→work terminal), a network affects the operation by a communication delay or packet loss, in addition to a conventional processing delay. This deteriorates operability, for example, a selection different from an operation intention is made or a character is erroneously input, and thus work efficiency is deteriorated. Furthermore, in order to solve this problem, it is necessary to improve a remote desktop application and create a function of accumulating and collectively transmitting character information.

The present invention has been made in view of the above, and an object of the present invention is to provide a communication system, a communication method, and a communication program capable of easily improving work efficiency without deteriorating operability in a remote environment.

Solution to Problem

In order to solve the above-described problems and achieve the object, a communication system of the present invention is a communication system including: a work terminal; and a remote terminal connected to the work terminal, wherein the work terminal includes: a notification unit configured to notify the remote terminal of a first identifier of a local UI component that is a UI component corresponding to a UI component displayed on the work terminal and is displayed on the remote terminal; and a reflection unit configured to reflect input information on the UI component corresponding to the local UI component in a case where the input information is received from the remote terminal, and the remote terminal includes: a display control unit configured to display a local UI component corresponding to the first identifier of the local UI component received from the work terminal; and a transmission unit configured to transmit input information to the work terminal in a case where the input information is input to the local UI component displayed by the display control unit.

Advantageous Effects of Invention

According to the present invention, it is possible to easily improve work efficiency without deteriorating operability in a remote environment.

BRIEF DESCRIPTION OF DRAWINGS

FIG. 3 is a diagram illustrating an example of information stored in a cooperation ID storage unit.

FIG. 5 is a diagram for describing an outline of processing of the work terminal and the remote terminal in the communication system.

FIG. 15 is a diagram illustrating a computer that executes a program.

DESCRIPTION OF EMBODIMENTS

Hereinafter, embodiments of a communication system, a communication method, and a communication program according to the present application will be described in detail with reference to the drawings. Note that the communication system, the communication method, and the communication program according to the present application are not limited by the embodiments.

[Configuration of Communication System]

Figure 1:
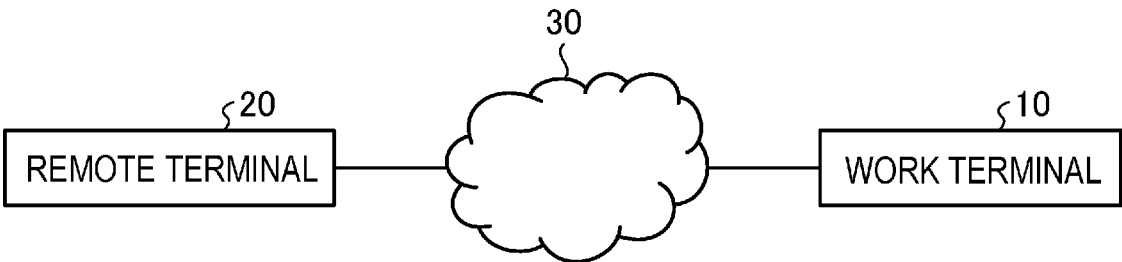
FIG. 1 is a block diagram illustrating a configuration example of a communication system according to the present embodiment.

FIG. 1 is a block diagram illustrating a configuration example of a communication system according to the present embodiment. Note that the configuration illustrated in FIG. 1 is merely an example, and a specific configuration is not particularly limited.

As illustrated in FIG. 1, the communication system of the present embodiment includes a work terminal 10 and a remote terminal 20, which are connected via a network 30. For example, the communication system is a remote environment in which the remote terminal 20 in a home or the like is remotely connected to the work terminal 10 in an office so that work can be performed.

Each of the work terminal 10 and the remote terminal 20 is, for example, a terminal such as a desktop PC, a notebook PC, a tablet PC, or a smartphone, and may be any type of information processing device.

In the remote terminal 20, a function of transmitting input information by an input device such as a mouse or a keyboard of a user to the work terminal 10 and displaying screen display information received from the work terminal 10 on a screen is operated. This function is generally implemented as an application in a user terminal, and is displayed as a window like other applications in the remote terminal 20. Note that the screen display information received from the work terminal 10 is the entire virtual desktop on the work terminal 10 side or a unit of a window in the virtual desktop.

In the communication system of the present embodiment, the work terminal 10 notifies the remote terminal 20 of a cooperation ID of a local UI component that is a UI component corresponding to a UI component displayed on the work terminal 10 and is displayed on the remote terminal 20. The remote terminal 20 then displays a local UI component corresponding to the cooperation ID of the local UI component received from the work terminal 10.

Subsequently, in a case where input information is input to the displayed local UI component, the remote terminal 20 transmits the input information to the work terminal 10. The work terminal 10 then reflects the input information on the UI component corresponding to the local UI component.

That is, in the communication system of the present embodiment, for example, the local UI component displayed on the remote terminal 20 side and the UI component displayed on the work terminal 10 as a connection destination are linked, and the input information input to the local UI component on the remote terminal 20 side is transmitted to the work terminal as a transmission link destination and reflected. As a result, in the communication system, it is possible to allow an operator to perform work without feeling the deterioration in operability caused by the reflection network environment, and as a result, it is possible to suppress deterioration in work efficiency.

[Configuration of Work Terminal]

Figure 2:
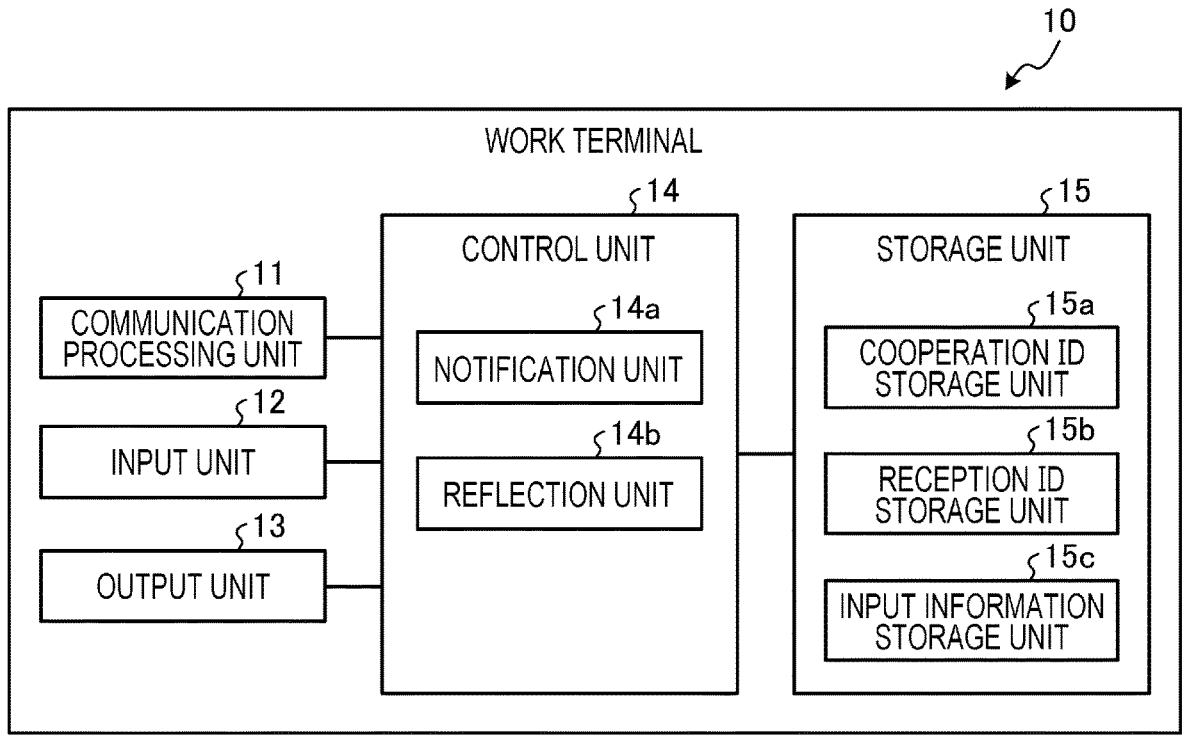
FIG. 2 is a block diagram illustrating a configuration of a work terminal of the present embodiment.

FIG. 2 is a block diagram illustrating a configuration of the work terminal of the present embodiment. As illustrated in FIG. 2, the work terminal 10 of the present embodiment is implemented by a general-purpose computer such as a personal computer, and includes a communication processing unit 11, an input unit 12, an output unit 13, a control unit 14, and a storage unit 15.

The communication processing unit 11 is implemented by a network interface card (NIC) or the like, and controls communication between an external device and the control unit 14 via an electric communication line such as a local area network (LANI) or the Internet. For example, the communication processing unit 11 controls communication between the remote terminal 20 and the control unit 14.

The input unit 12 is implemented by use of an input device such as a keyboard or a mouse, and inputs various types of instruction information such as a processing start to the control unit 14 in response to an input operation by an operator. The output unit 13 is implemented by a display device such as a liquid crystal display.

The storage unit 15 stores data and programs necessary for various types of processing by the control unit 14, and includes a cooperation ID storage unit 15a, a reception ID storage unit 15b, and an input information storage unit 15c. For example, the storage unit 15 is a semiconductor memory element such as a random access memory (RAN) or a flash memory, or a storage device such as a hard disk or an optical disk.

The cooperation ID storage unit 15a stores, in association with each other, a local UI component displayed on the remote terminal 20 side and a UI component displayed on the work terminal 10 as a connection destination in association with a cooperation ID. For example, as illustrated in FIG. 3, the cooperation ID storage unit 15a stores the cooperation ID, an ID of the UI component displayed on the work terminal 10 as a connection destination, and an ID of the local UI component displayed on the remote terminal 20 side in association with each other. FIG. 3 is a diagram illustrating an example of information stored in the cooperation ID storage unit.

The reception ID storage unit 15b stores a reception ID assigned to connection information received from the remote terminal 20. The input information storage unit 15c stores input information received from the remote terminal 20.

The control unit 14 includes an internal memory for storing a program defining various processing procedures and the like and required data, and executes various types of processing using the program and the data. For example, the control unit 14 includes a notification unit 14a and a reflection unit 14b. Here, the control unit 14 is an electronic circuit such as a central processing unit (CPU) or a micro processing unit (MPU), or an integrated circuit such as an application specific integrated circuit (ASIC) or a field programmable gate array (FPGA).

The notification unit 14a notifies the remote terminal 20 of the cooperation ID of the local UI component that is a UI component corresponding to the UI component displayed on the work terminal 10 and is displayed on the remote terminal 20. For example, in a case where the UI component is displayed on the output unit 13, the notification unit 14a acquires the cooperation ID associated with the local UI component corresponding to the UI component from the cooperation ID storage unit 15a. The notification unit 14a then notifies the remote terminal 20 of screen information including a code (for example, a QR code (registered trademark)) indicating the acquired cooperation ID and coordinate information indicating coordinates for displaying the local UI component on the remote terminal 20.

In the case of receiving input information from the remote terminal 20, the reflection unit 14b reflects the input information on the UI component corresponding to the local UI component. For example, the reflection unit 14b receives the cooperation ID together with the input information from the remote terminal 20, specifies the UI component corresponding to the cooperation ID, and reflects the input information on the specified UI component.

Furthermore, in a case where a reception ID is received together with the input information, the reflection unit 14*b* determines whether the reception ID is consecutive to a reception ID received last time, and in a case where the reception ID is not consecutive to the reception ID received last time, the reflection unit 14*b* requests the remote terminal 20 to perform retransmission. Furthermore, in a case where a reception ID is received together with the input information, the reflection unit 14*b* determines whether the reception ID overlaps with a previously received reception ID, and in a case where the reception ID overlaps with the previously received reception ID, the reflection unit 14*b* reflects the received input information or discards the received input information.

[Configuration of Remote Terminal]

Figure 4:
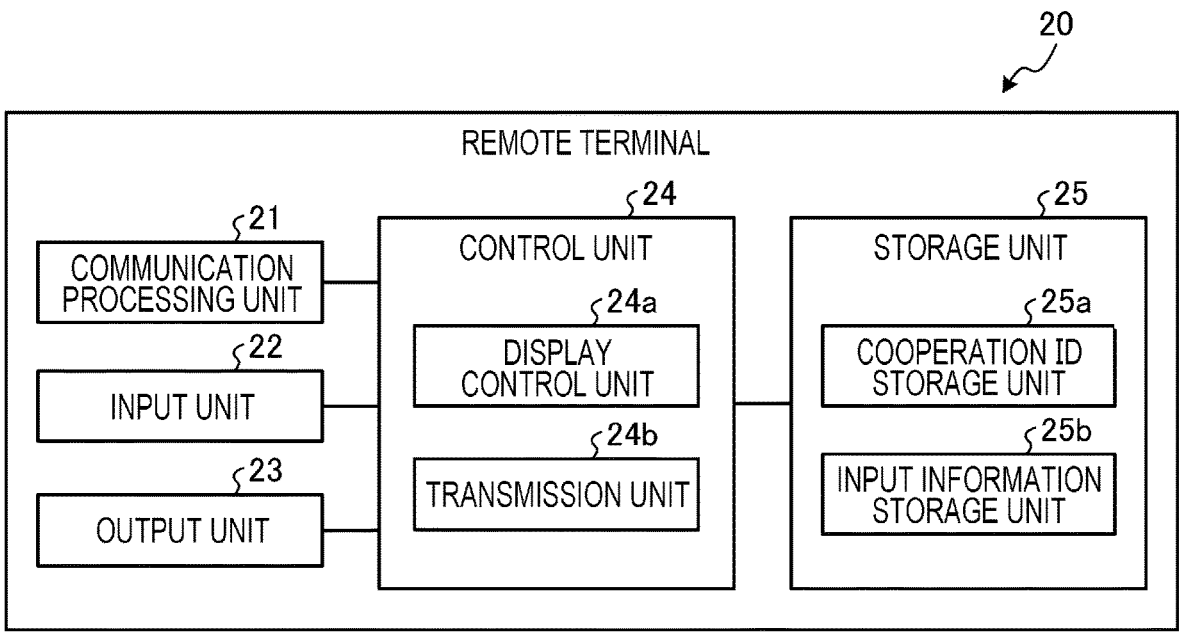
FIG. 4 is a block diagram illustrating a configuration of a remote terminal of the present embodiment.

FIG. 4 is a block diagram illustrating a configuration of the remote terminal of the present embodiment. As illustrated in FIG. 4, the remote terminal 20 of the present embodiment is implemented by a general-purpose computer such as a personal computer, and includes a communication processing unit 21, an input unit 22, an output unit 23, a control unit 24, and a storage unit 25.

The communication processing unit 21 is implemented by a network interface card (NIC) or the like, and controls communication between an external device and the control unit 24 via an electric communication line such as a local area network (LANl) or the Internet. For example, the communication processing unit 21 controls communication between the work terminal 10 and the control unit 24.

The input unit 22 is implemented by use of an input device such as a keyboard or a mouse, and inputs various types of instruction information such as a processing start to the control unit 24 in response to an input operation by an operator. The output unit 23 is implemented by a display device such as a liquid crystal display.

The storage unit 25 stores data and programs necessary for various types of processing by the control unit 24, and includes a cooperation ID storage unit 25*a* and an input information storage unit 25*b*. For example, the storage unit 25 is a semiconductor memory element such as a random access memory (RAN) or a flash memory, or a storage device such as a hard disk or an optical disk.

The cooperation ID storage unit 25*a* stores, in association with each other, a local UI component displayed on the remote terminal 20 side and a UI component displayed on the work terminal 10 as a connection destination in association with a cooperation ID. The input information storage unit 25*b* stores input information input to the local UI component.

The control unit 24 includes an internal memory for storing a program defining various processing procedures and the like and required data, and executes various types of processing using the program and the data. For example, the control unit 24 includes a display control unit 24*a* and a transmission unit 24*b*. Here, the control unit 24 is an electronic circuit such as a central processing unit (CPU) or a micro processing unit (MPU), or an integrated circuit such as an application specific integrated circuit (ASIC) or a field programmable gate array (FPGA).

The display control unit 24*a* displays a local UI component corresponding to the cooperation ID of the local UI component received from the work terminal 10. For example, when receiving screen information including a code (for example, a QR code) indicating the cooperation ID corresponding to the local UI component to be displayed and coordinate information for displaying the local UI component from the work terminal, the display control unit 24*a* displays a screen on the basis of the screen information. The display control unit 24*a* then acquires the code from the displayed screen by image recognition, and acquires the cooperation ID and the coordinate information indicated by the code. Subsequently, the display control unit 24*a* searches the cooperation ID storage unit 25*a* for the local UI component corresponding to the acquired cooperation ID, and displays the local UI component obtained by the search in an overlaid manner at the coordinate position on the remote desktop screen indicated by the coordinate information. Note that the display control unit 24*a* may analyze the resolution of the displayed code and display the local UI component in an enlarged or reduced size according to the resolution.

In a case where input information is input to the local UI component displayed by the display control unit 24*a*, the transmission unit 24*b* transmits the input information to the work terminal 10. For example, in a case where input information is input to the local UI component, the transmission unit 24*b* may store the input information in the input information storage unit 25*b*, and in a case where a predetermined threshold level or more of input information is accumulated in the input information storage unit 25*b*, the transmission unit 24*b* may transmit the input information stored in the input information storage unit 25*b* to the work terminal 10.

In addition, the transmission unit 24*b* assigns predetermined consecutive reception IDs to input information input to the local UI component, and transmits the reception IDs to the work terminal 10 together with the input information. Furthermore, in a case where there is no predetermined response from the work terminal 10, the transmission unit 24*b* stores input information in the input information storage unit 25*b*, and in a case where there is a predetermined response from the work terminal 10, the transmission unit 24*b* transmits the input information stored in the input information storage unit 25*b* to the work terminal 10.

As described above, in the communication system, the local UI component on the remote terminal 20 side and the UI component of the work terminal 10 are associated by use of the cooperation ID. Furthermore, in order to check whether the remote terminal 20 has correctly performed transmission, transmission IDs are assigned to transmission information, and the transmission/reception history is checked between the remote terminal 20 and the work terminal 10. Furthermore, in a case where there is a missing number in the transmission IDs, the remote terminal 20 may perform retransmission.

Furthermore, input information input to the remote terminal 20 may be accumulated for any period and collectively output. As a result, in the communication system, it is possible to reduce the load on the network as compared with the case where transmission is performed each time information is input. Furthermore, for example, the remote terminal 20 may observe a situation in which a packet is lost due to deterioration in signal quality, and in a case where the packet loss is at an arbitrary rate or higher, the remote terminal may transmit output information a plurality of times to improve the rate of arrival at the work terminal side.

Figure 6:
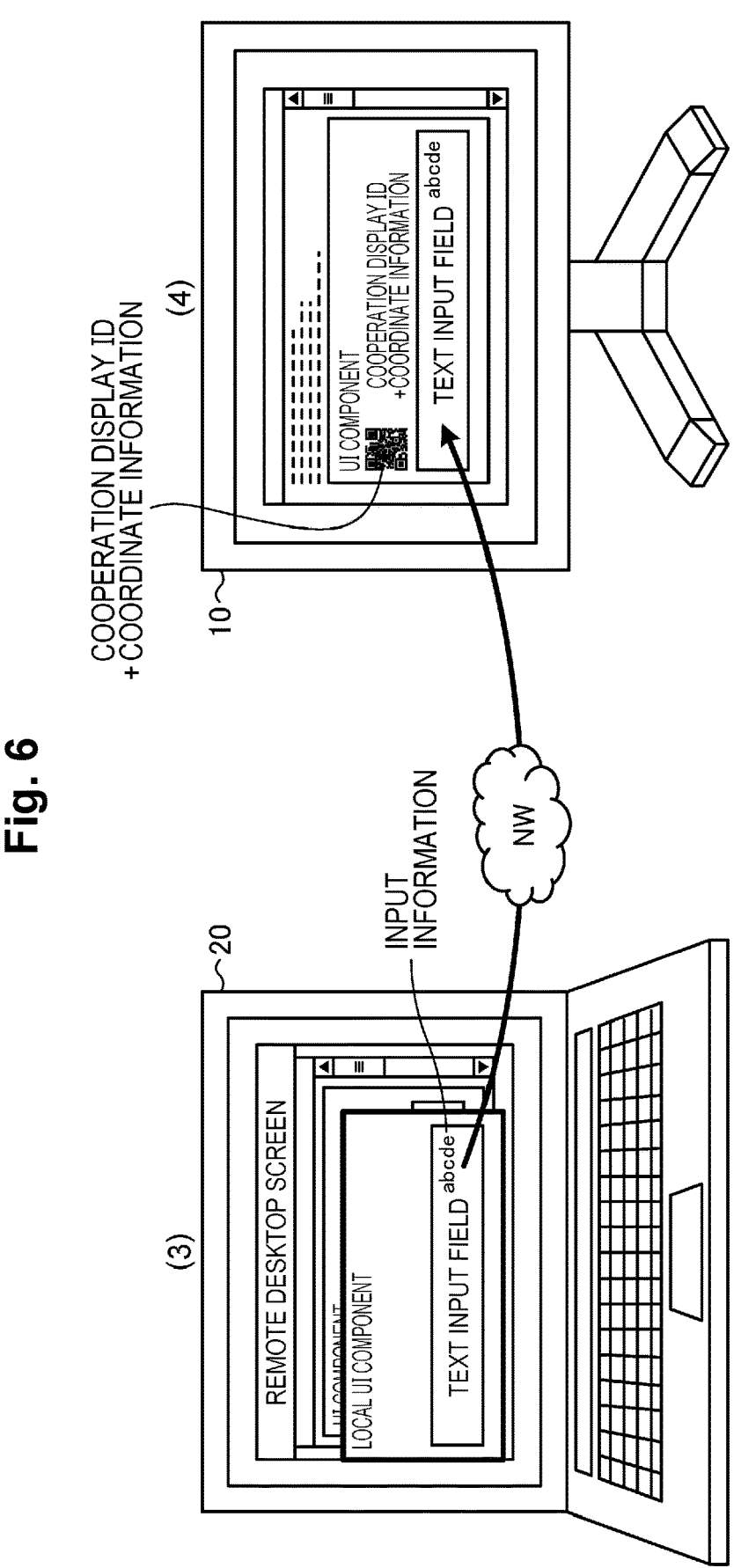
FIG. 6 is a diagram for describing the outline of the processing of the work terminal and the remote terminal in the communication system.

Here, an outline of processing of the work terminal 10 and the remote terminal 20 in the communication system will be described with reference to FIGS. 5 and 6. FIGS. 5 and 6 are diagrams for describing the outline of the processing of the work terminal and the remote terminal in the communication system. As illustrated in (1) of FIG. 5, in a case where a UI component is displayed, the notification unit 14*a* of the work terminal 10 acquires a cooperation ID (described as cooperation display ID in the examples of FIGS. 5 and 6) associated with a local UI component corresponding to the UI component from the cooperation ID storage unit 15*a*. The notification unit 14*a* then notifies the remote terminal 20 of screen information including a QR code indicating the acquired cooperation ID and coordinate information indicating coordinates for displaying the local UI component on the remote terminal 20.

As illustrated in (2) of FIG. 5, when receiving the screen information including the code (for example, the QR code) indicating the cooperation ID corresponding to the local UI component to be displayed and the coordinate information for displaying the local UI component from the work terminal, the display control unit 24*a* of the remote terminal 20 displays a screen on the basis of the screen information. The display control unit 24*a* then acquires the code from the displayed screen by image recognition, and acquires the cooperation ID and the coordinate information indicated by the code. Subsequently, the display control unit 24*a* searches the cooperation ID storage unit 25*a* (described as internal storage (or DB) in the example of FIG. 5) for the local UI component corresponding to the acquired cooperation ID.

As illustrated in (3) of FIG. 6, the display control unit 24*a* then displays the local UI component obtained by the search in an overlaid manner at the coordinate position on the remote desktop screen indicated by the coordinate information. Thereafter, in a case where input information is input to the local UI component displayed by the display control unit 24*a*, the transmission unit 24*b* transmits the input information to the work terminal 10.

As illustrated in (4) of FIG. 6, the reflection unit 14*b* of the work terminal 10 then receives the cooperation ID together with the input information from the remote terminal 20, specifies the UI component corresponding to the cooperation ID, and reflects the input information on the specified UI component.

Figure 7:
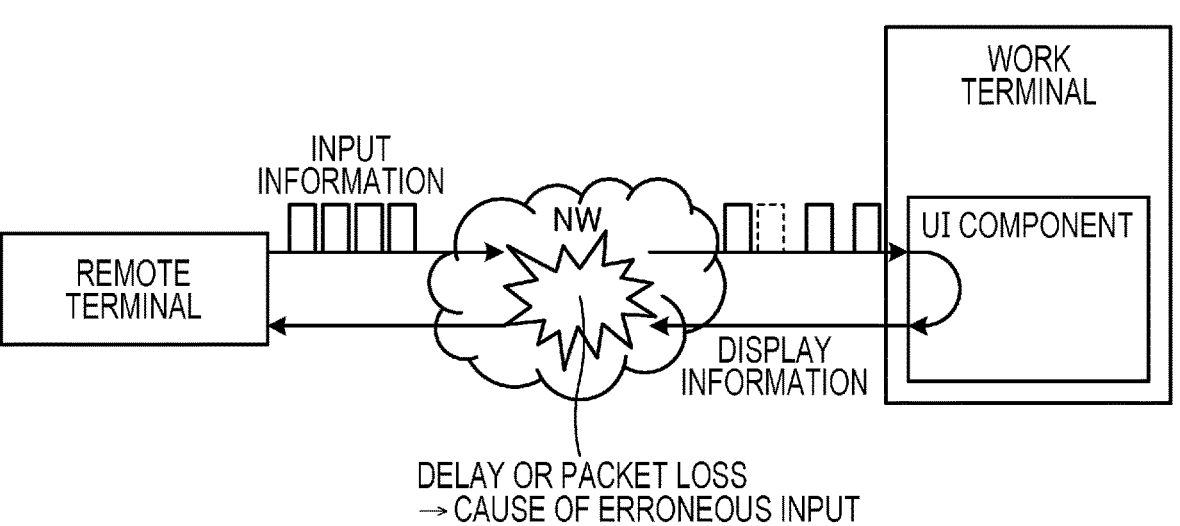
FIG. 7 is a diagram for describing a conventional problem.
Figure 8:
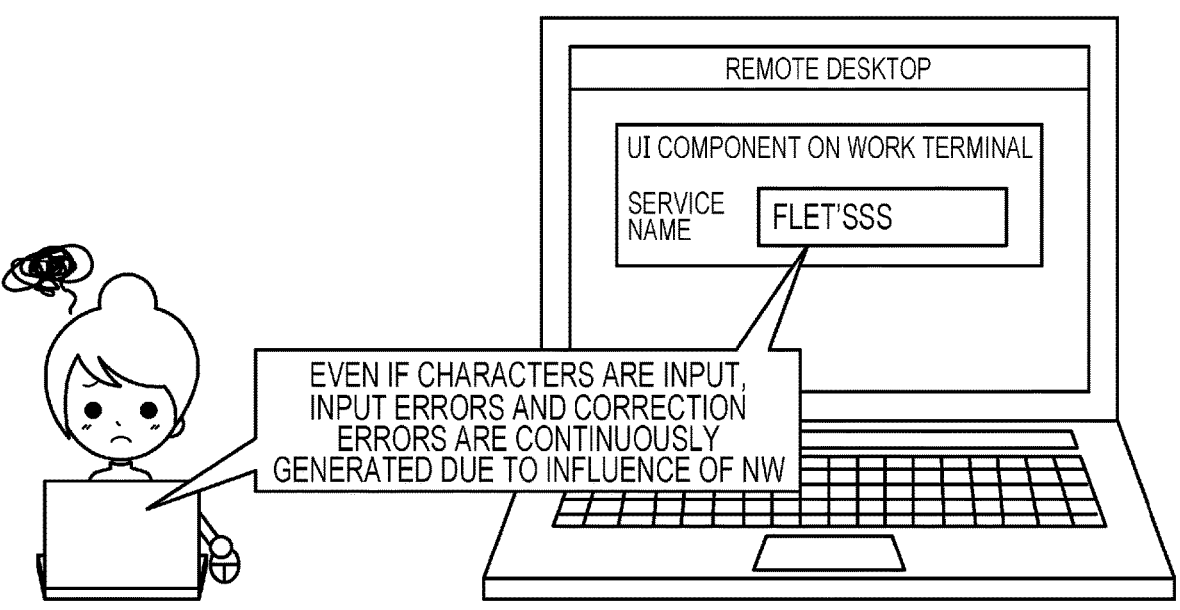
FIG. 8 is a diagram for describing the conventional problem.

Here, a conventional problem will be described with reference to FIGS. 7 and 8. FIGS. 7 and 8 are diagrams for describing a conventional problem. As illustrated in FIG. 7, conventionally, the remote terminal side sequentially transmits input information, and the work terminal side sequentially reflects the input information. In this case, in a case where a delay or packet loss occurs due to the influence of a network environment, the delay or packet loss causes erroneous input. Therefore, as illustrated in FIG. 8, even if a user inputs characters on the remote terminal, input errors and correction errors are continuously generated due to the influence of the network. That is, there is a conventional problem that, for example, when a user inputs a text on a remote terminal, characters cannot be input as desired due to the influence of a delay on a network, packet loss, or the like, and work efficiency is reduced.

Figure 9:
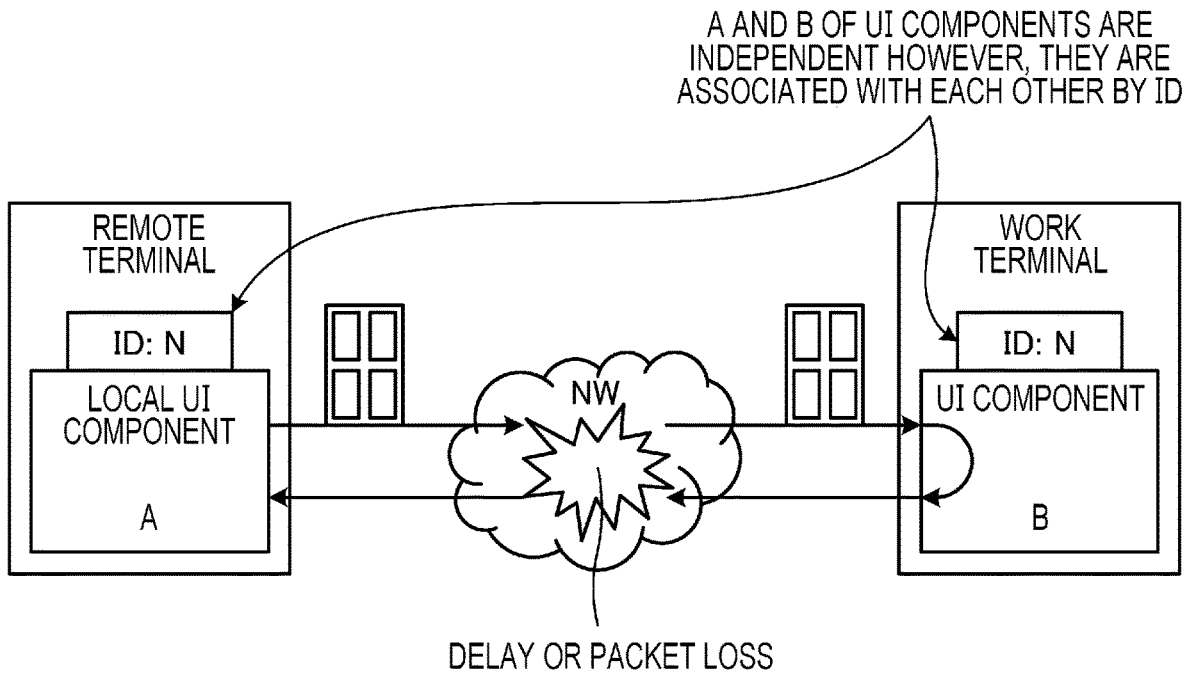
FIG. 9 is a diagram for describing effects of the communication system according to the present embodiment.
Figure 10:
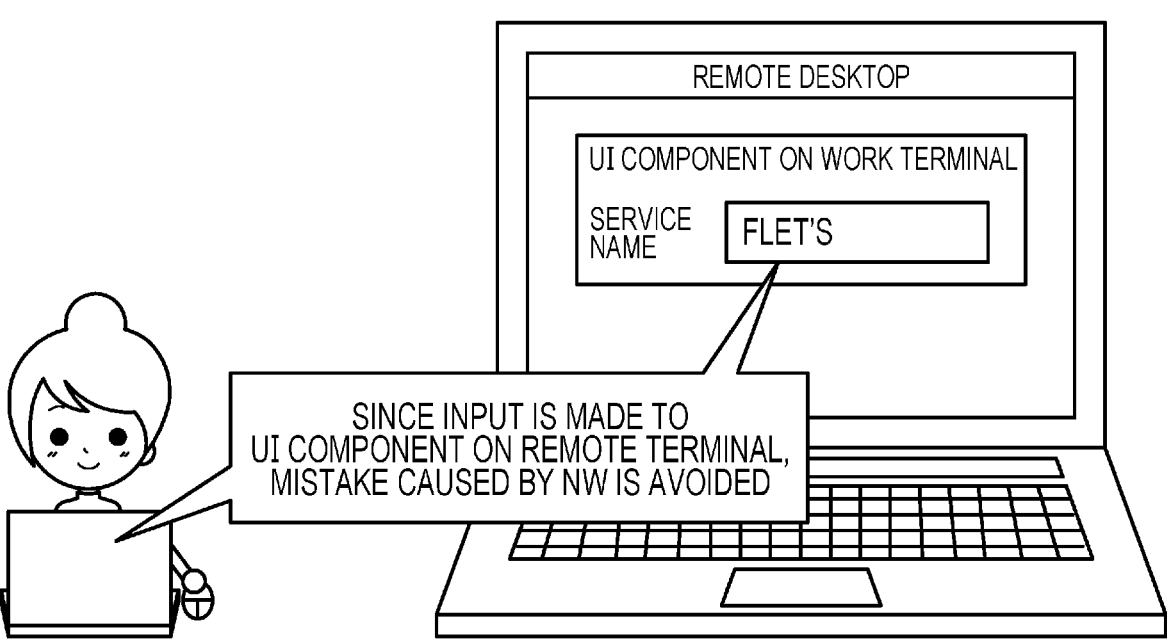
FIG. 10 is a diagram for describing the effects of the communication system according to the present embodiment.

Next, effects of the communication system according to the present embodiment will be described with reference to FIGS. 9 and 10. FIGS. 9 and 10 are diagrams for describing the effects of the communication system according to the present embodiment. As illustrated in FIG. 9, in the communication system according to the present embodiment, a local UI component "A" of the remote terminal 20 and a UI component "B" of the work terminal 10 are independent from each other, but are associated with each other by a cooperation ID. Therefore, even if a delay or packet loss occurs, occurrence of erroneous input can be prevented. That is, as illustrated in FIG. 10, since the remote terminal

20 makes an input to the local UI component, which is a UI component displayed only on the remote terminal 20, it is possible to avoid a mistake caused by the network without touching a remote desktop application, and as a result, it is possible to suppress deterioration in work efficiency.

[Processing Procedure of Communication System]

Figure 11:
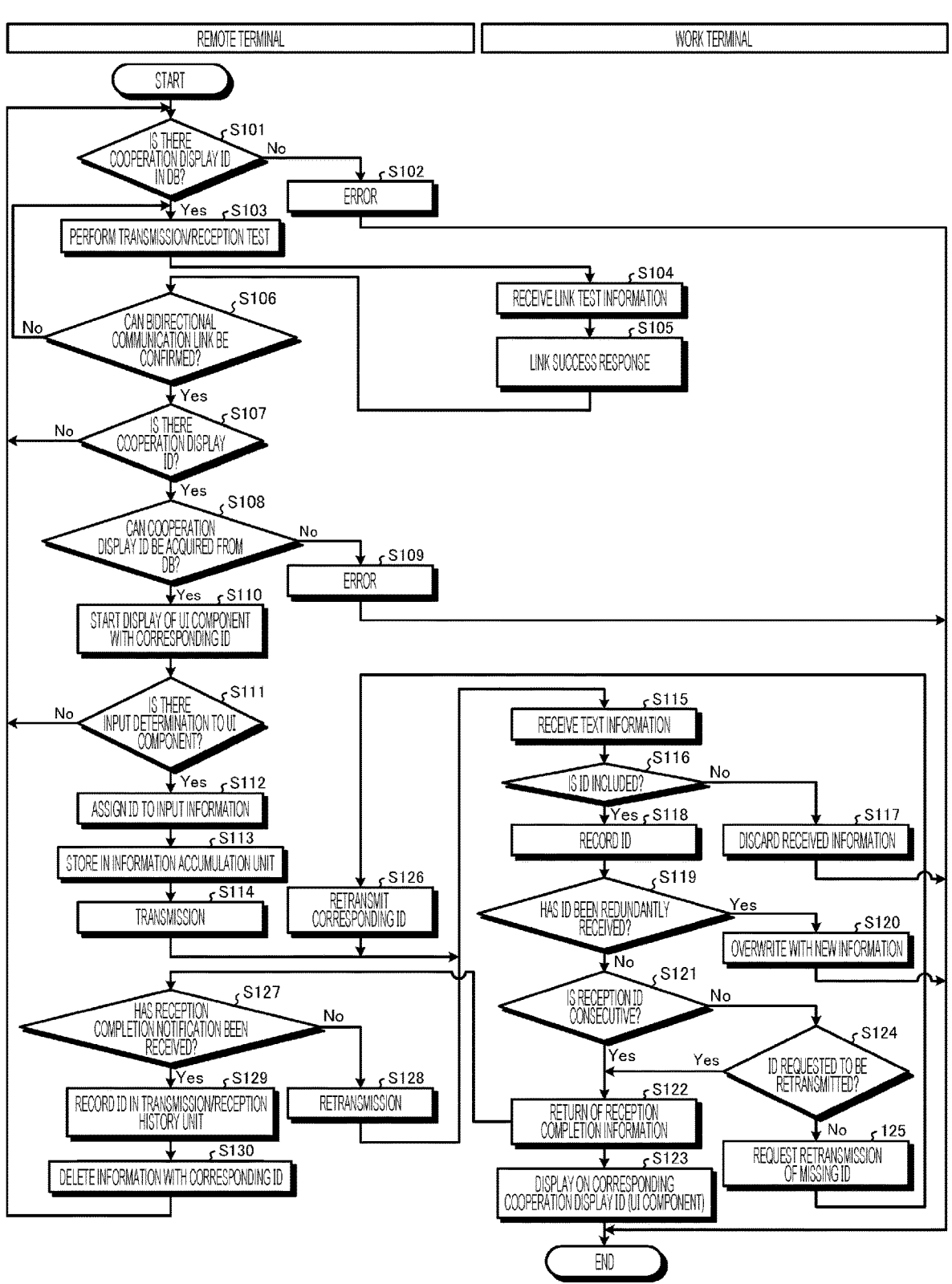
FIG. 11 is a sequence diagram illustrating an example of a processing flow of the communication system according to the present embodiment.

Next, an example of a processing procedure of processing executed by the work terminal 10 and the remote terminal 20 in the communication system will be described with reference to FIG. 11. FIG. 11 is a sequence diagram illustrating an example of a processing flow of the communication system according to the present embodiment.

As illustrated in FIG. 11, the remote terminal 20 determines whether there is a cooperation ID (described as cooperation display ID in FIG. 11) in the cooperation ID storage unit 25*a* (described as DB in FIG. 11) (step S101). As a result, in a case where there is no cooperation ID in the cooperation ID storage unit 25*a* (No in step S101), the remote terminal 20 outputs an error (step S102), and ends the processing.

Furthermore, in a case where there is a cooperation ID in the cooperation ID storage unit 25*a* (Yes in step S101), the remote terminal 20 performs a transmission/reception test (step S103). The work terminal 10 receives a link test from the remote terminal 20 (step S104), and transmits a link success response to the remote terminal 20 (step S105).

The remote terminal 20 then confirms a bidirectional communication link (step S106), and in a case where the bidirectional communication link cannot be confirmed (No in step S106), the processing returns to step S103. In addition, in a case where the bidirectional communication link can be confirmed (Yes in step S106), the remote terminal 20 displays a local UI component corresponding to the cooperation ID of a local UI component received from the work terminal 10, acquires a code from the displayed screen by image recognition, acquires the cooperation ID indicated by the code, and determines whether the acquired cooperation ID is in the cooperation ID storage unit 25*a* (step S107). As a result, in a case where the acquired cooperation ID is not in the cooperation ID storage unit 25*a* (No in step S107), the remote terminal 20 returns to the processing of step S101.

Furthermore, in a case where the acquired cooperation ID is in the cooperation ID storage unit 25*a* (Yes in step S107), the remote terminal 20 determines whether the cooperation ID can be acquired from the cooperation ID storage unit 25*a* (step S108). As a result, in a case where the cooperation ID cannot be acquired from the cooperation ID storage unit 25*a* (No in step S108), the remote terminal 20 outputs an error (step S109) and ends the processing.

Furthermore, in a case where the cooperation ID can be acquired from the cooperation ID storage unit 25*a* (Yes in step S108), the remote terminal 20 starts display of the UI component with the ID (step S110). That is, the remote terminal 20 displays the local UI component corresponding to the cooperation ID in an overlaid manner. The remote terminal 20 then determines whether there is an input determination to the local UI component (step S111), and if there is no input determination (No in step S111), the processing returns to step S101. In addition, in a case where there is an input determination (Yes in step S111), the remote terminal 20 assigns a reception ID to the input information (step S112), stores the input information in the input information storage unit 25*b* (described as information accumulation unit in FIG. 11) (step S113), and transmits the input information and the reception ID to the work terminal 10 (step S114).

The work terminal 10 then receives text information as input information (step S115), and determines whether the received information includes a reception ID (step S116). As a result, in a case where there is no reception ID (No in step S116), the work terminal 10 discards the received information (step S117) and ends the processing.

In addition, in a case where there is a reception ID (Yes in step S116), the work terminal 10 records the reception ID in the reception ID storage unit 15*b* (step S118), and determines whether the same reception ID has been redundantly received (step S119).

As a result, in a case where the same reception ID has been redundantly received (Yes in step S119), the work terminal 10 overwrites received information with the new information (step S120). Note that, in a case where the same reception ID has been redundantly received, the work terminal 10 may discard the received information. Furthermore, in a case where the same reception ID has not been redundantly received (No in step S119), the work terminal 10 determines whether the reception ID is consecutive (step S121). As a result, in a case where the reception ID is consecutive (Yes in step S121), the work terminal 10 returns a return of reception completion information to the remote terminal 20 (step S122), and displays the input information on the UI component corresponding to the cooperation ID (step S123). That is, the work terminal 10 reflects the input information on the UI component.

Furthermore, in a case where the reception ID is not consecutive (No in step S121), the work terminal 10 determines whether the ID is an ID requested to be retransmitted (step S124). As a result, in a case where the ID is an ID requested to be retransmitted (Yes in step S124), the work terminal 10 proceeds to the processing of step S122. Furthermore, in a case where the ID is not an ID requested to be retransmitted (No in step S124), the work terminal 10 requests the remote terminal 20 to retransmit a missing reception ID (missing ID) (step S125). The remote terminal 20 then retransmits the requested corresponding reception ID and input information to the work terminal 10 (step S126), and the processing proceeds to step S115.

In addition, the remote terminal 20 determines whether the reception completion notification has been received from the work terminal 10 (step S127). In a case where the reception completion notification has not been received from the work terminal 10 (No in step S127), the reception ID and the input information are retransmitted to the work terminal 10 (step S128), and the processing proceeds to step S115. Furthermore, in a case where the reception completion notification has been received from the work terminal 10 (Yes in step S127), the remote terminal 20 records the reception ID in a transmission/reception history unit (not illustrated) (step S129), and deletes the information with the ID (step S130), and the processing returns to step S101.

Figure 12:
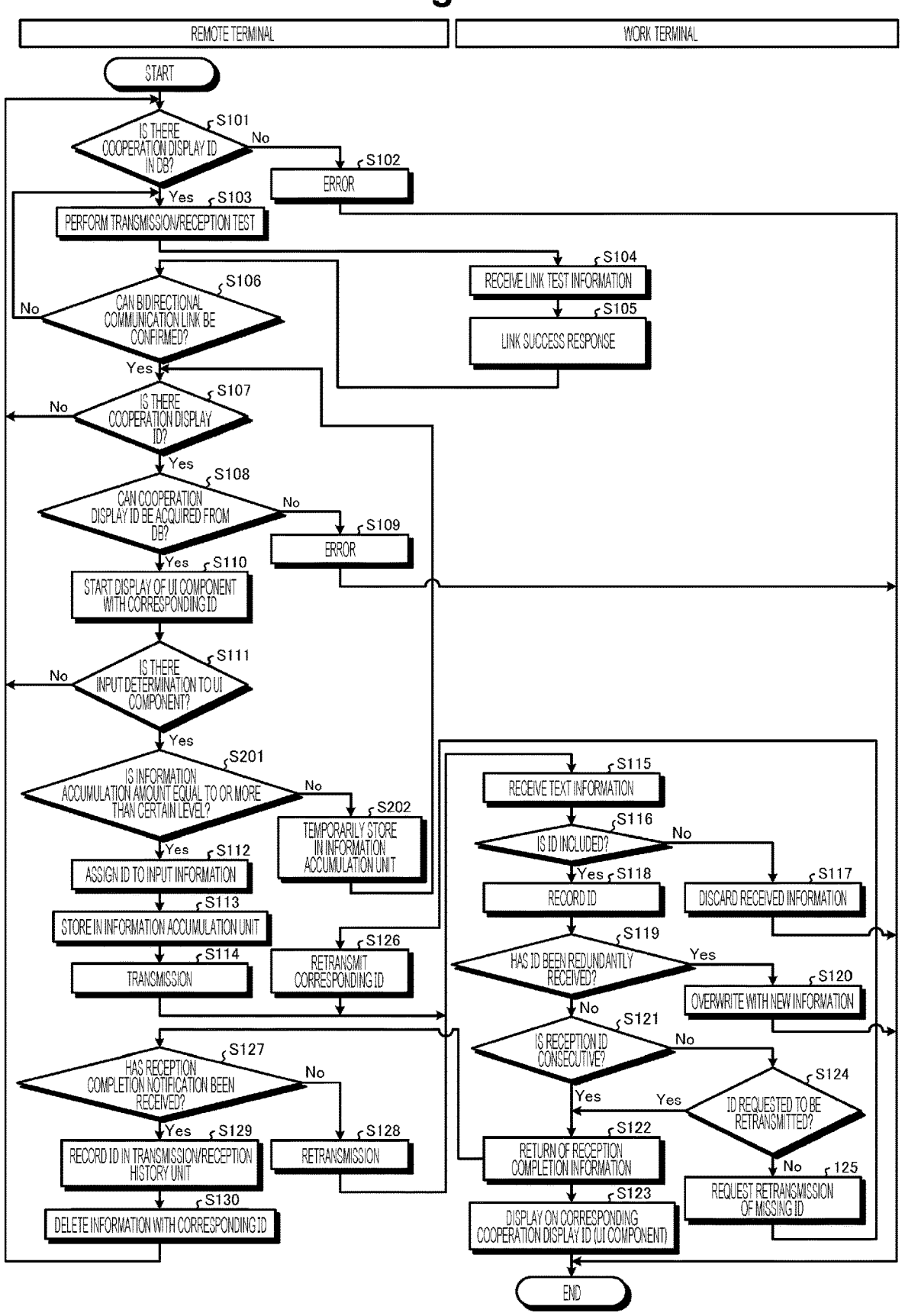
FIG. 12 is a sequence diagram illustrating an example of a processing flow of the communication system according to another embodiment.
Figure 13:
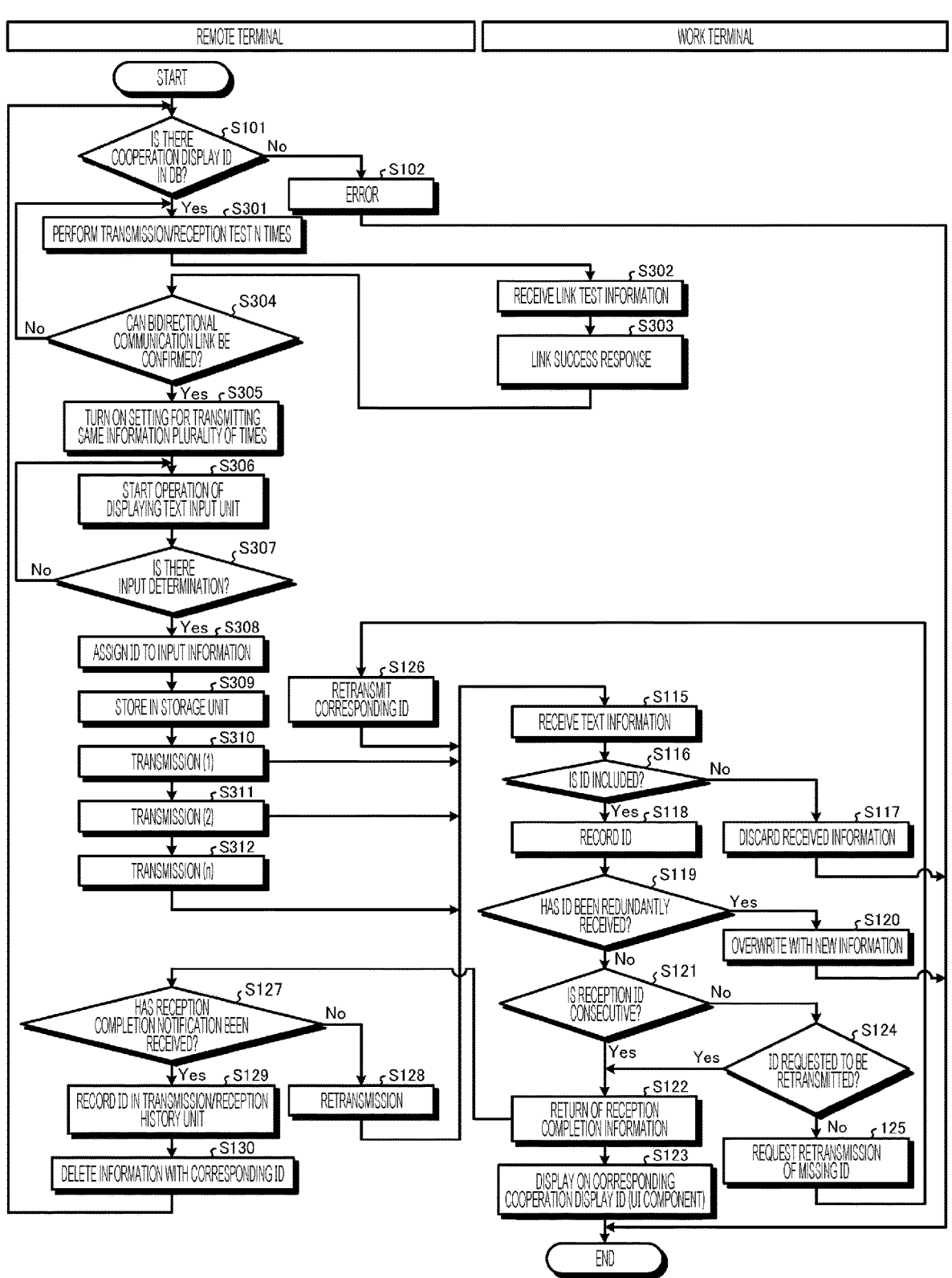
FIG. 13 is a sequence diagram illustrating an example of a processing flow of the communication system according to another embodiment.
Figure 14:
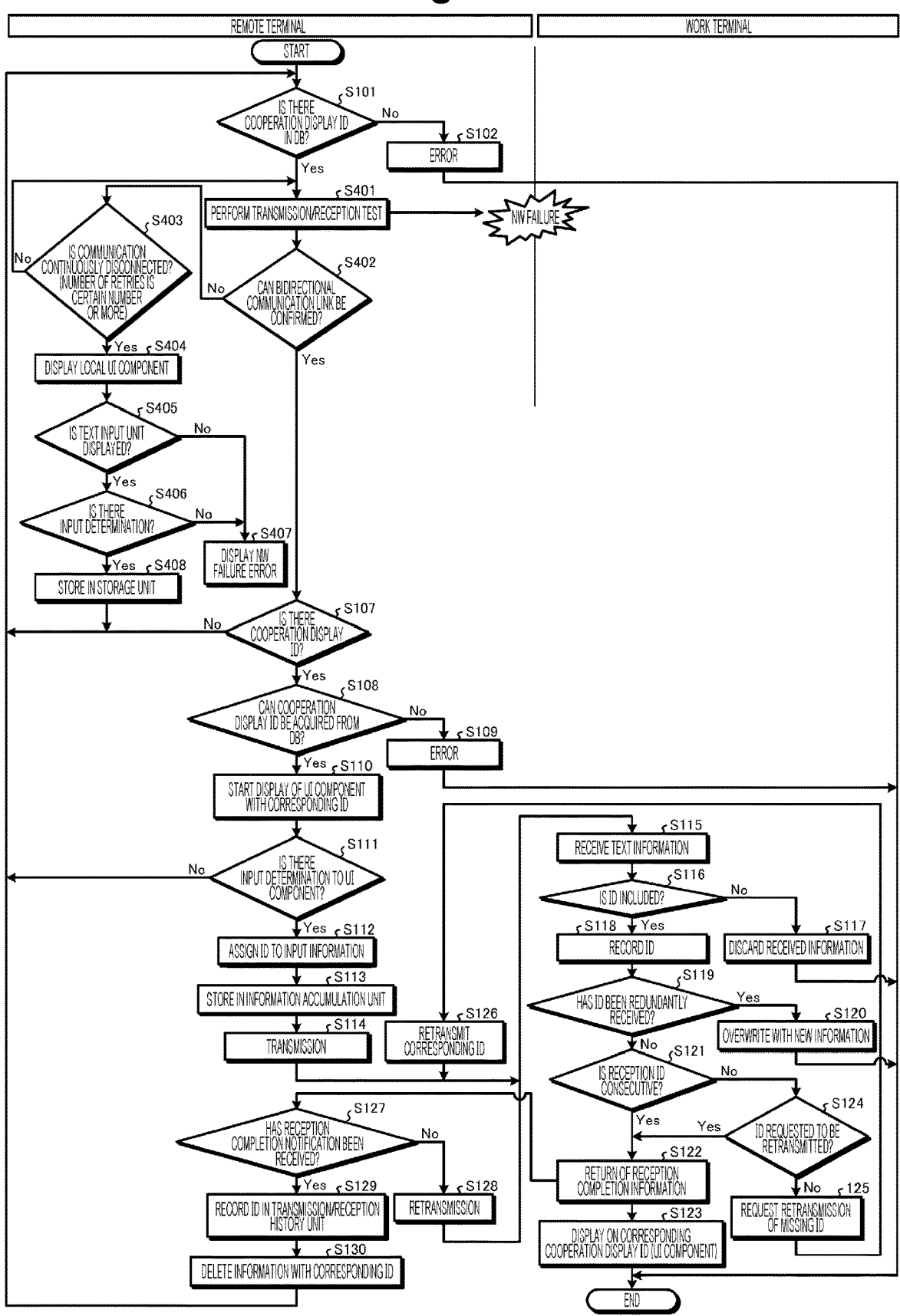
FIG. 14 is a sequence diagram illustrating an example of a processing flow of the communication system according to another embodiment.

In addition, the processing flow executed by the work terminal 10 and the remote terminal 20 in the communication system is not limited thereto. Examples of processing flows of the communication system according to other embodiments will be described below with reference to FIGS. 12 to 14. Note that description of processing similar to that in FIG. 11 will be omitted. FIGS. 12 to 14 are sequence diagrams illustrating examples of processing flows of the communication system according to other embodiments.

As illustrated in FIG. 12, the remote terminal 20 may reduce frequent information transmission by collectively transmitting input information when the input information reaches a certain input amount. In the example of FIG. 12, in a case where it is determined that there is an input determination (Yes in step S111), the remote terminal 20 determines whether the information accumulation amount of the input information in the input information storage unit 25*b* is equal to or more than a certain level (step S201). As a result, in a case where the information accumulation amount of the input information in the input information storage unit 25*b* is not equal to or more than the certain level (No in step S201), the remote terminal 20 returns to step S107. In addition, in a case where the information accumulation amount of the input information in the input information storage unit 25*b* is equal to or more than the certain level (Yes in step S201), the remote terminal 20 proceeds to step S112. That is, in a case where a predetermined threshold level or more of input information is accumulated in the input information storage unit 25*b*, the remote terminal 20 transmits the input information stored in the input information storage unit 25*b* to the work terminal 10.

Next, as illustrated in FIG. 13, the remote terminal 20 may improve the reception probability on the work terminal 10 side by performing multiplex transmission in consideration of packet loss. In the example of FIG. 13, in a case where it is determined that there is a cooperation ID in the cooperation ID storage unit 25*a* (Yes in step S101), the remote terminal 20 performs a transmission/reception test N times set in advance (step S301). The work terminal 10 receives a link test from the remote terminal 20 (step S302), and transmits a link success response to the remote terminal 20 (step S303).

The remote terminal 20 then confirms a bidirectional communication link (step S304), and in a case where the bidirectional communication link cannot be confirmed (No in step S304), the processing returns to step S301. In addition, in a case where the bidirectional communication link can be confirmed (Yes in step S304), the remote terminal 20 turns on the setting for transmitting the same information a plurality of times (step S305), accepts text input by the input unit 12, and starts an operation of displaying the local UI component (step S306).

The remote terminal 20 then determines whether there is an input determination to the local UI component (step S307), and if there is no input determination (No in step S307), the processing returns to step S306. In addition, in a case where there is an input determination (Yes in step S307), the remote terminal 20 assigns a reception ID to the input information (step S308), stores the input information in the input information storage unit 25*b* (described as storage unit in FIG. 13) (step S309), and transmits the input information and the reception ID to the work terminal 10 n times (steps S310 to S312).

As described above, the remote terminal 20 can improve the reception probability on the work terminal 10 side by performing multiplex transmission in consideration of packet loss. Note that the remote terminal 20 may determine whether the communication quality is equal to or higher than a designated value in a case where the bidirectional communication link can be confirmed, perform the processing of step S305 and subsequent steps only in a case where the communication quality is lower than the designated value, and may not perform multiplex transmission in a case where the communication quality is equal to or higher than the designated value, similarly to the processing of FIG. 13.

Next, as illustrated in FIG. 14, in a case where continuous communication disconnection occurs due to a network failure, the remote terminal 20 may accumulate input information and may resume transmission in a case where the communication is recovered. As illustrated in FIG. 14, in a case where it is determined that there is a cooperation ID in the cooperation ID storage unit 25*a* (Yes in step S101), the remote terminal 20 performs a transmission/reception test (step S401). Here, in the example of FIG. 14, it is assumed that the transmission/reception test fails because a failure occurs in the network. The remote terminal 20 then confirms a bidirectional communication link (step S402), and in a case where the bidirectional communication link cannot be confirmed (No in step S402), the processing of step S401 to 402 is repeated a plurality of times to determine whether the communication is continuously disconnected (step S403).

In a case where it is determined that the communication is continuously disconnected (Yes in step S403), the remote terminal 20 displays the local UI component (step S404). The remote terminal 20 then determines whether a text input unit as the displayed local UI component is displayed (step S405). As a result, in a case where the text input unit is displayed (Yes in step S405), the remote terminal 20 determines whether there is an input determination to the local UI component (step S406). Here, in step S405, in a case where the text input unit is not displayed (No in step S405) or in a case where there is no input determination to the local UI component (No in step S406), an error is displayed as a network failure (step S407).

Furthermore, in a case where there is an input determination to the local UI component (Yes in step S406), the remote terminal 20 stores the input information in the input information storage unit 25*b* (step S408), and the processing returns to step S101. As described above, in a case where continuous communication disconnection occurs due to a network failure, the remote terminal 20 may accumulate input information and resume transmission in a case where the communication is recovered.

Effects of Embodiments

As described above, in the communication system according to the embodiments, the work terminal 10 notifies the remote terminal 20 of a cooperation ID of a local UI component that is a UI component corresponding to a UI component displayed on the work terminal 10 and is displayed on the remote terminal 20. The remote terminal 20 then displays a local UI component corresponding to the cooperation ID of the local UI component received from the work terminal 10. Subsequently, in a case where input information is input to the displayed local UI component, the remote terminal 20 transmits the input information to the work terminal 10. The work terminal 10 then reflects the input information on the UI component corresponding to the local UI component. For this reason, in the communication system according to the embodiments, it is possible to easily improve work efficiency without deteriorating operability in a remote environment.

That is, screen display of input information to the local UI component in the remote terminal 20 is independent from the work terminal 10 side, and the input information is separately transmitted to the UI component of the work terminal 10, so that an operator can avoid a display delay, an input error, and the like due to a delay or packet loss caused by the network, which can easily improve the work efficiency without deteriorating the operability.

[System Configuration and the Like]

Each component of each device illustrated according to the above embodiments is functionally conceptual and does not necessarily have to be physically configured as illustrated. That is, a specific form of distribution and integration of each device is not limited to the illustrated form, and all or a part thereof can be functionally or physically distributed and integrated in any unit according to various loads, usage conditions, and the like. Furthermore, all or any part of the processing functions performed in each device can be implemented by a CPU and a program analyzed and executed by the CPU, or can be implemented as hardware by wired logic.

Furthermore, among the processing described in the above embodiments, all or a part of the processing described as being automatically performed can be manually performed, or all or a part of the processing described as being manually performed can be automatically performed by a known method. In addition, the processing procedures, the control procedures, the specific names, and the information including various data and parameters illustrated in the above document and drawings can be arbitrarily changed unless otherwise specified.

[Program]

In addition, it is also possible to create a program in which the processing executed by the work terminal 10 and the remote terminal 20 described in the above embodiments is described in a language executable by a computer. In this case, the computer executes the program, and thus the effects similar to those of the above embodiments can be obtained. Furthermore, the program may be recorded in a computer-readable recording medium, and the program recorded in the recording medium may be read and executed by the computer to implement processing similar to that of the above embodiments.

Figure 15:
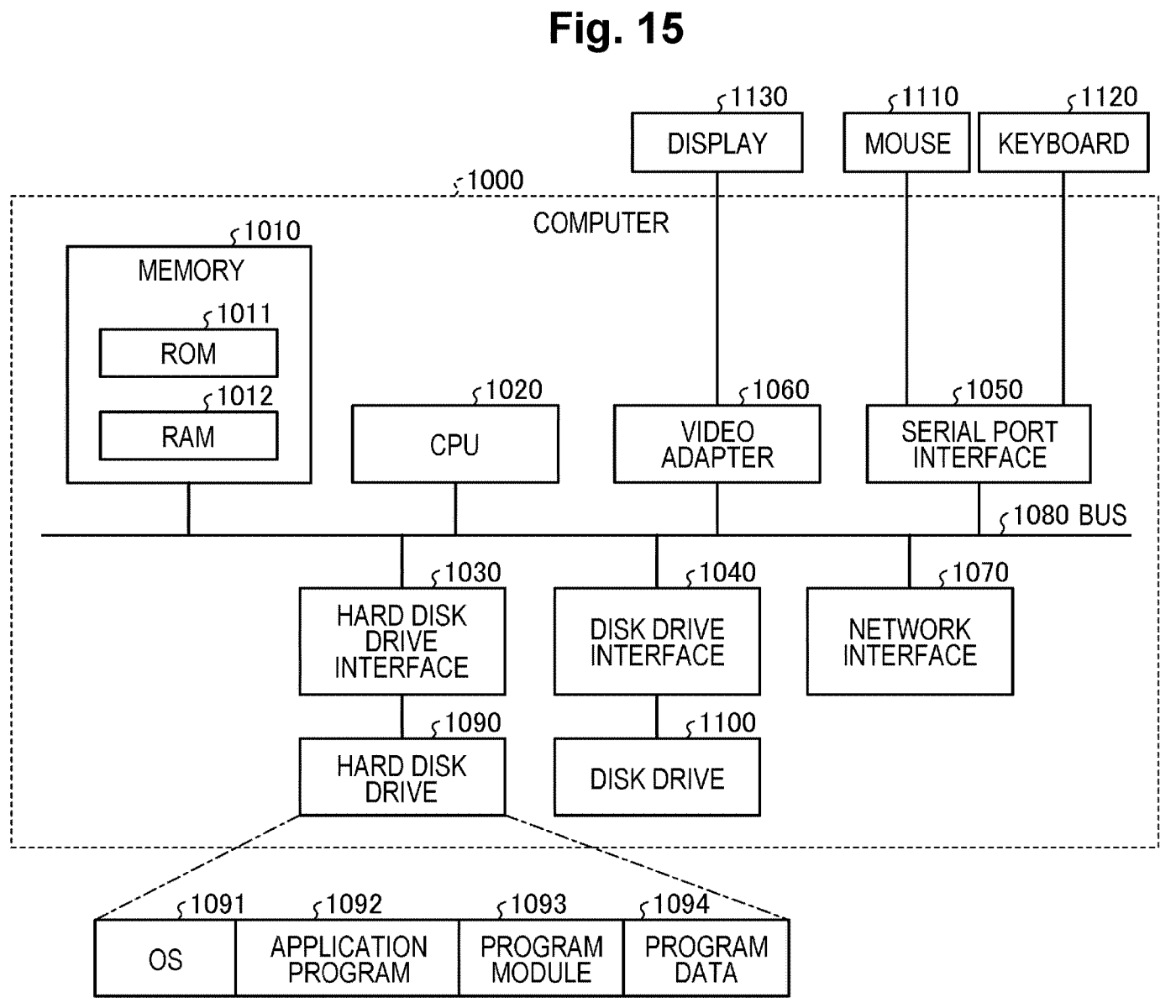

FIG. 15 is a diagram illustrating a computer that executes a program. As illustrated in FIG. 15, a computer 1000 includes, for example, a memory 1010, a CPU 1020, a hard disk drive interface 1030, a disk drive interface 1040, a serial port interface 1050, a video adapter 1060, and a network interface 1070, and these units are connected by a bus 1080.

As illustrated in FIG. 15, the memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090 as illustrated in FIG. 15. The disk drive interface 1040 is connected to a disk drive 1100 as illustrated in FIG. 15. For example, a removable storage medium such as a magnetic disk or an optical disk is inserted into the disk drive 1100. As illustrated in FIG. 15, the serial port interface 1050 is connected to, for example, a mouse 1110 and a keyboard 1120. As illustrated in FIG. 15, the video adapter 1060 is connected to, for example, a display 1130.

Here, as illustrated in FIG. 15, the hard disk drive 1090 stores, for example, an OS 1091, an application program 1092, a program module 1093, and program data 1094. That is, the above program is stored as a program module in which a command executed by the computer 1000 is described, for example, in the hard disk drive 1090.

In addition, various data described in the above embodiments is stored as program data in, for example, the memory 1010 and the hard disk drive 1090. The CPU 1020 then reads the program module 1093 and the program data 1094 stored in the memory 1010 and the hard disk drive 1090 to the RAM 1012 as necessary, and executes various processing procedures.

Note that the program module 1093 and the program data 1094 related to the program are not limited to being stored in the hard disk drive 1090, and may be stored in, for example, a removable storage medium and read by the CPU 1020 via the disk drive or the like. Alternatively, the program module 1093 and the program data 1094 related to the program may be stored in another computer connected via a network (such as a local area network (LAN1) or a wide area network (WAN1)) and read by the CPU 1020 via the network interface 1070.

Although the embodiments to which the invention made by the present inventors is applied have been described above, the present invention is not limited by the description and the drawings constituting a part of the disclosure of the present invention according to the present embodiments. That is, other embodiments, examples, operation techniques, and the like made by those skilled in the art on the basis of the present embodiments are all included in the scope of the present invention.

REFERENCE SIGNS LIST

10 Work terminal
11, 21 Communication processing unit
12, 22 Input unit
13, 23 Output unit
14, 24 Control unit
14a Notification unit
14b Reflection unit
15, 25 Storage unit
15a, 25a Cooperation ID storage unit
15b Reception ID storage unit
15c, 25b Input information storage unit
24a Display control unit
14b Transmission unit

The invention claimed is:

1. A communication system comprising: a work terminal; and a remote terminal connected to the work terminal, wherein the work terminal includes one or more processors and is configured to perform:

a notifying the remote terminal of a first identifier of a local UI component that is a UI component corresponding to a UI component displayed on the work terminal and is displayed on the remote terminal;

reflecting input information on the UI component corresponding to the local UI component in a case where the input information is received from the remote terminal, and the remote terminal includes one or more processors and is configured to perform:

displaying a local UI component corresponding to the first identifier of the local UI component received from the work terminal;

transmitting input information to the work terminal in a case where the input information is input to the local UI component displayed by the remote terminal;

assigning predetermined consecutive second identifiers to the input information input to the local UI component; and transmitting the second identifiers to the work terminal together with the input information, wherein the work terminal is further configured to perform:

in a case where one of the second identifiers is received together with the input information, determining whether the one of the second identifiers is consecutive to a second identifier received last time; and in a case where the one of the second identifiers is not consecutive to the second identifier received last time, requesting the remote terminal to perform retransmission.

2. The communication system according to claim 1, wherein in a case where the input information is input to the local UI component, the remote terminal is configured to store the input information in a storage unit, and in a case where a predetermined threshold level or more of input information is accumulated in the storage unit, the remote terminal is configured to transmit the input information stored in the storage unit to the work terminal.

3. The communication system according to claim 1, wherein in a case where there is no predetermined response from the work terminal, the remote terminal is configured to store the input information in a storage unit, and in a case where there is a predetermined response from the work terminal, the remote terminal is configured to transmit the input information stored in the storage unit to the work terminal.

4. The communication system according to claim 1, wherein in a case where one of the second identifiers is received together with the input information, the work terminal is configured to determine whether the one of the second identifiers overlaps with a previously received second identifier, and in a case where the one of the second identifiers overlaps with the previously received second identifier, the work terminal is configured to reflect the received input information or discards the received input information.

5. A communication method executed by a communication system including a work terminal and a remote terminal connected to the work terminal, the communication method comprising:

notifying, by the work terminal, the remote terminal of a first identifier of a local UI component that is a UI component corresponding to a UI component displayed on the work terminal and is displayed on the remote terminal;

displaying, by the remote terminal, a local UI component corresponding to the first identifier of the local UI component received from the work terminal;

transmitting, by the remote terminal, input information to the work terminal in a case where the input information is input to the local UI component displayed by the remote terminal;

reflecting, by the work terminal, the input information on the UI component corresponding to the local UI component;

assigning, by the remote terminal, predetermined consecutive second identifiers to the input information input to the local UI component;

transmitting, by the remote terminal, the second identifiers to the work terminal together with the input information;

in a case where one of the second identifiers is received together with the input information, determining, by the work terminal, whether the one of the second identifiers is consecutive to a second identifier received last time; and in a case where the one of the second identifiers is not consecutive to the second identifier received last time, requesting, by the remote terminal, the remote terminal to perform retransmission.

6. The communication method according to claim 5, further comprising:

wherein in a case where the input information is input to the local UI component, storing, by the remote terminal, the input information in a storage unit; and in a case where a predetermined threshold level or more of input information is accumulated in the storage unit, transmitting, by the remote terminal, the input information stored in the storage unit to the work terminal.

7. The communication method according to claim 5, further comprising:

in a case where there is no predetermined response from the work terminal, storing, by the remote terminal, the input information in a storage unit; and in a case where there is a predetermined response from the work terminal, transmitting, by the remote terminal, the input information stored in the storage unit to the work terminal.

8. The communication method according to claim 7, further comprising:

in a case where one of the second identifiers is received together with the input information, determining, by the work terminal, whether the one of the second identifiers overlaps with a previously received second identifier; and in a case where the one of the second identifiers overlaps with the previously received second identifier, reflecting, by the work terminal, the received input information or discards the received input information.

9. A non-transitory computer readable storage medium storing a communication program for causing computers to execute a communication method, wherein the communication program causes a computer as a work terminal to execute:

notifying a remote terminal of a first identifier of a local UI component that is a UI component corresponding to a UI component displayed on the work terminal and is displayed on the remote terminal; and reflecting input information on the UI component corresponding to the local UI component in a case where the input information is received from the remote terminal, and the communication program causes a computer as the remote terminal connected to the work terminal to execute:

displaying a local UI component corresponding to the first identifier of the local UI component received from the work terminal;

transmitting input information to the work terminal in a case where the input information is input to the displayed local UI component;

assigning predetermined consecutive second identifiers to the input information input to the local UI component; and transmitting the second identifiers to the work terminal together with the input information, wherein the communication program further causes the computer as the work terminal to execute:

in a case where one of the second identifiers is received together with the input information, determining whether the one of the second identifiers is consecutive to a second identifier received last time; and in a case where the one of the second identifiers is not consecutive to the second identifier received last time, requesting the remote terminal to perform retransmission.

\* \* \* \* \*